(12) United States Patent
O'Brien et al.

(10) Patent No.: US 9,056,447 B2
(45) Date of Patent: Jun. 16, 2015

(54) FLEXIBLE MULTILAYER VINYLIDENE FLUORIDE TUBES

(75) Inventors: Gregory S. O'Brien, Downingtown, PA (US); William J. Hartzel, Cherry HIll, NJ (US); James J. Henry, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 517 days.

(21) Appl. No.: 12/307,626

(22) PCT Filed: Jun. 26, 2007

(86) PCT No.: PCT/US2007/072082
§ 371 (c)(1),
(2), (4) Date: Jan. 6, 2009

(87) PCT Pub. No.: WO2008/005744
PCT Pub. Date: Jan. 10, 2008

(65) Prior Publication Data
US 2009/0202759 A1 Aug. 13, 2009

Related U.S. Application Data

(60) Provisional application No. 60/818,901, filed on Jul. 6, 2006.

(51) Int. Cl.
*B32B 1/08* (2006.01)
*B32B 25/08* (2006.01)
*B32B 27/30* (2006.01)
*F16L 11/04* (2006.01)

(52) U.S. Cl.
CPC . *B32B 27/30* (2013.01); *B32B 1/08* (2013.01); *B32B 25/08* (2013.01); *F16L 11/04* (2013.01)

(58) Field of Classification Search
None
See application file for complete search history.

(56) References Cited

U.S. PATENT DOCUMENTS

| | | | |
|---|---|---|---|
| 4,317,860 A * | 3/1982 | Strassel | 428/421 |
| 4,714,650 A | 12/1987 | Obayashi et al. | |
| 5,419,374 A | 5/1995 | Nawrot et al. | |
| 5,500,257 A | 3/1996 | Krause et al. | |
| 5,570,711 A | 11/1996 | Walsh | |
| 5,662,975 A * | 9/1997 | Hert et al. | 428/36.91 |
| 5,916,404 A | 6/1999 | Krause et al. | |
| 6,378,562 B1 | 4/2002 | Noone et al. | |
| 6,428,866 B1 * | 8/2002 | Jadamus et al. | 428/36.4 |
| 6,432,542 B1 * | 8/2002 | Tsai | 428/421 |
| 6,479,161 B1 * | 11/2002 | Araki et al. | 428/515 |
| 6,517,657 B1 | 2/2003 | Kuenzel et al. | |
| 6,576,342 B1 | 6/2003 | Cerf et al. | |
| 6,629,961 B1 * | 10/2003 | Israelsson et al. | 604/265 |
| 7,011,873 B2 | 3/2006 | Brule et al. | |
| 2002/0106470 A1 | 8/2002 | Merziger et al. | |
| 2002/0112950 A1 | 8/2002 | Topolkaraev et al. | |
| 2003/0031891 A1 | 2/2003 | Fields | |
| 2005/0136205 A1 | 6/2005 | Stoppelmann et al. | |
| 2005/0175843 A1 | 8/2005 | Johnson | |
| 2005/0218075 A1 | 10/2005 | Graetz et al. | |
| 2006/0013977 A1 | 1/2006 | Duke et al. | |
| 2006/0018777 A1 * | 1/2006 | Zumbrum | 417/476 |

FOREIGN PATENT DOCUMENTS

| | | |
|---|---|---|
| CN | 1147447 | 4/1997 |
| EP | 294127 A2 * | 12/1988 |
| JP | 8142151 | 6/1996 |
| JP | 08142151 A * | 6/1996 |
| JP | 2001-193659 | 7/2001 |
| JP | 2001193872 | 7/2001 |
| JP | 2002019051 A | 1/2002 |
| JP | 2002338769 A * | 11/2002 |
| JP | 2005-188739 | 7/2005 |
| WO | WO 96/16801 | 6/1996 |
| WO | WO 2005/090065 A1 | 9/2005 |
| WO | WO 2006/045636 A1 | 5/2006 |

OTHER PUBLICATIONS

Machine translation of JP 08-142,151A, Jun. 1996.*
CN200780025339.5 (Search Report), Jun. 26, 2007, Zerafati, S., et al.

* cited by examiner

*Primary Examiner* — Ramsey Zacharia
(74) *Attorney, Agent, or Firm* — Thomas F. Roland

(57) ABSTRACT

The invention relates to a tough, flexible multi-layer tube or other structure having a vinylidene fluoride contact layer. Such a tube is especially useful for high-purity contact applications, and contact where chemical resistance is needed. The vinylidene fluoride layer is melt-processible and may be a homopolymer, copolymer or terpolymer.

14 Claims, No Drawings

US 9,056,447 B2

FLEXIBLE MULTILAYER VINYLIDENE FLUORIDE TUBES

This application claims benefit, under U.S.C. §119 or §365 of U.S. Provisional Application No. 60/818,901, filed Jul. 6, 2006; and PCT/US2007/072082, filed Jun. 26, 2007.

FIELD OF THE INVENTION

The invention relates to a tough, flexible multi-layer tube or other structure having a vinylidene fluoride homopolymer or copolymers as the contact layer. Such a tube is especially useful for high-purity contact applications, and/or chemical contact applications where excellent chemical resistance is needed. The vinylidene fluoride layer is melt-processible and may be a homopolymer, copolymer, terpolymer, blends or alloy.

BACKGROUND OF THE INVENTION

Tough, flexible tubing is useful in many commercial and industrial applications. Such tubing can be pinched off for a long period of time, or compressed thousands of times, yet quickly regain its original shape. The tubing must not lose flexibility, nor crack or break in use.

Many applications and manufacturing processes require tubing that is not only tough and flexible—but is also chemically and biologically inert. The inside surface of such tubing must be non-reactive with the fluid (liquid or gas) passing through it, have excellent barrier properties, and should have little or no extractables.

Current tubing technology used in biopharmaceutical applications, for example, includes silicone, thermoplastic polyolefins (TPO), thermoplastic polyethylene (TPE), and expanded PTFE composite tubing.

One of the applications of the tubing is for use in peristaltic pumps. Peristaltic pumps are non-contact positive displacement pumps used for transferring fluids. The transfer of the fluid is generated by successive compression of the walls of the tube, creating pressure to transfer the fluid. This application needs a tube with excellect memory and recovery properties. For these applications, there is a need for a high purity, chemically resistant tube with good barrier properties. Peristaltic pumps are useful in the transfer of chemicals and biopharmaceutical materials, where the fluid does not contact the pump.

Polyvinylidene fluoride (PVDF) is known for its high chemical resistant and inertness. Unfortunately, PVDF does not possess the high flexibility and restitution needed to withstand the rigorous cycles of a peristaltic pump.

Surprisingly it has been found that a multi-layer tube having a thin layer of PVDF as the fluid contact layer having one or more layers of flexible polymer outside fulfill the requirements for a peristaltic pump application. Currently, there are no products in the market that can match the balance of properties of the tubes of the invention in terms of the contact layer purity, chemical resistance and barrier properties, combined with the flexibility and restitution (or spring back) of the overall structure.

SUMMARY OF THE INVENTION

The invention relates to a multi-layer flexible structure comprising a polyvinylidene fluoride contact layer, and an elastomeric layer where the polyvinylidene fluoride layer is adhered directly or indirectly to the elastomeric layer.

DETAILED DESCRIPTION OF THE INVENTION

The invention relates to a flexible multi-layer structure having a thin polyvinylidene fluoride contact layer and an elastomeric polymer non-contact layer.

By "flexible", as used herein, is meant that the multi-layer structure retains the ability to recover its original shape after deformation over repeated cycles. The structure must be deformable, and exhibit restitution to its original shape.

The PVDF contact layer provides excellent chemical and permeation resistance combined with extremely low or no extractables. PVDF is one of the purest commercially available polymers for extractables. It is also a semi-crystaline fluoropolymer with excellent chemical resistance to a whole range of chemicals. In addition, it has excellent permeation resistance to $H_2O$, $CO_2$, $O_2$, CO, and hydrocarbon fuels, as well as many other compounds.

Polyvinylidene fluoride polymers of the invention include the homopolymer made by polymerizing vinylidene fluoride (VDF), and copolymers, terpolymers and higher polymers of vinylidene fluoride, where the vinylidene fluoride units comprise greater than 70 percent of the total weight of all the monomer units in the polymer, and more preferably, comprise greater than 75 percent of the total weight of the monomer units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers include those comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); and from about 71 to 99 weight percent VDF, and correspondingly from about 1 to 29 weight percent chlorotrifluoroethylene (CTFE).

Preferred terpolymers are the terpolymer of VDF, HFP and TFE, and the terpolymer of VDF, trifluoroethene, and TFE. Especially preferred terpolymers have at least 71 weight percent VDF, and the other comonomers may be present in varying portions, but together they comprise up to 29 weight percent of the terpolymer.

Most preferred PVDF copolymers include are those having 2 to 30 weight percent of HFP, such as KYNAR FLEX 2800, 2750 and 2500 resins (Arkema Inc.).

The polyvinylidene fluoride could also be a functionalized PVDF, produced by either copolymerization or by post-polymerization functionalization such as Kynar ADX from Arkema. Kynar ADX could be a blend or pure grafted polymer. The use of a functionalized PVDF for the contact layer could be useful in industrial applications where the highest purity is not a major concern. However, in biopharmaceutical and other application requiring high purity, the functional PVDF is not as useful for direct surface contact, since some of the functional monomers could leach out from the PVDF. As such, a functional PVDF, such as a maleic anhydride-grafted PVDF could be used in cases requiring only chemical resistance, but would not be the best candidate for a biopharmaceutical application.

The PVDF could also be a blend or alloy of PVDF with other PVDF polymers, or with polymers that are compatible with PVDF, such as polymethyl methacrylate and polymethyl methacrylate copolymers; and THV (a fluorinated terpolymer of tetrafluoroethylene, hexafluoropropylene and vinylidene fluoride). In the case of a blend or alloy, and least 50 weight percent of the overall composition is PVDF.

The PVDF contact layer is a thin layer of from 3 to 500 microns, preferably from 15 to 150 microns, and most preferably from 25 to 75 microns in thickness. The thickness and composition of the PVDF layer will be dependent on the application for which the structure will be used.

By "multi-layer" structure or tube, as used herein, is meant a structure having two or more layers, with the contact layer (the inner layer of a tube) being a PVDF. The structure may consist of 2, 3, 4, 5, 6 or more layers adhered together. Tie layers and adhesive layers may be included as part of the structure, or the different layers may adhere together without tie-layers or adhesives.

Polyvinylidene fluoride generally does not possess sufficient flexibility to return to its original shape when continually deformed. Therefore, the structure of the invention needs to be of a multi-layer construction, having a PVDF contact layer and at least one elastomeric layer to compensate for the elastic recovery shortcoming of the PVDF contact material. The over-all multi-layer structure will thus have the flexibility and restitution so it can be deformed and recover for hundreds and even thousands of cycles.

Elastomeric polymers are those having the ability to return to their original shape when a load is removed. Elastomeric polymers most useful in the elastomeric layer(s) of the invention are those that can easily be melt-processible. The elastomeric layer could also be one that could be applied to the PVDF layer and then cured in a secondary operation. Examples of useful elastomers include, but are not limited to, elastomeric polyamide TPE (thermoplastic elastomer), such as PEBAX (Arkema Inc.); thermoplastic vulcanates (TPV) such as SANTOPRENE (polypropylene-EPDM TPV produced by Advanced Elastomer Systems); thermoplastic olefins (TPO) such as Engage (ethylene-propylene polyolefin elastomer produced by Dow Chemical); thermoplastic vulcanates (TPV) containing grafted or reacted functional groups including maleic anhydride or glycidal methacrylate, such as SANTOPRENE; thermoplastic vulcanates that are polyamide based (PA based) or thermoplastic polyester elastomer based (such as HYTREL produced by Dupont); Acrylate Rubbers such as SEBS (styrene-ethylene-butylene-styrene copolymer produced by Shell, thermoplastic polyurethanes (TPU based on polyesters or polyethers); polyester type TPE such as HYTREL; fluoroelastomers (VITON from Dupont, Kynar Ultraflex from Arkema Inc), silicones, Neoprene, nitrile rubber, butyl rubber, polyamides, polyolefins such as polyethylene and polypropylene, chlorinated vinyls, such as PVC and flexibilized PVC where the flexibililzed PVC is typically plasticized.

One difficulty with constructing a multi-layer structure with a PVDF is that few materials adhere well to PVDF, and therefore constructing a multi-layer structure with restitution properties can be challenging. In one embodiment, a maleic anhydride functional PVDF, such as KYNAR ADX from Arkema Inc., can be directly adhered to the PVDF contact layer, and then can adhere to many elastomeric compounds.

Another method for adhering a PVDF to an elastomer is through the use of a tie layer. The tie layer or layers are known in the art, and can be selected depending on the elastomeric layer, and can include, but are not limited to, one or more of the following materials: KYNAR ADX, LOTADER (functionalized polyethylene from Arkema), OREVAC (functionalized PE from Arkema), thermoplastic polyurethanes (TPU), CPE (chlorinated polyethylene), functional tie layers (TPO-thermoplastic olefins), polyamides, particularily amine terminated, fluoropolymers, polyolefins, polymethylmetacrilate, and other acryilcs. These materials can also be blended in some cases to make a superior tie layer. For example blending TPU and Pebax would allow for an excellent high temperature tie layer for a Kynar and Pebax structure. Another example is blending Engage with Lotader to produce a flexible tie layer having sufficient functionality to adhere to Kynar ADX. In addition, blending Kynar and PMMA to enhance the properties of the PMMA to allow for a more robust overall construction.

The elastomeric layer will vary in thickness depending on the dimensional requirements in the end-use application. Generally, the elasomeric layer is in the range of from 250 to 1500 micons. The elastomeric layer is generally thicker than the PVDF layer of the structure for best restitution of the structure, though it could be the same or somewhat smaller in thickness.

When the multi-layer structure of the invention is used as a flexible tube, the tube can have any dimensions. Typical tubing sizes for tubing used in a peristolic pump application are from about ⅛ inch to two inches.

It is within the scope of the invention to have a PVDF layer—with the same or different composition from that of the contact layer—as an outer layer in the multi-layer structure, along with one or more middle elastic layers. Having an outer PVDF layer enables welding to other PVDF components, such as a PVDF bag, that could be used in biopharmaceutical applications. The PVDF on the outer layer can be either pure PVDF or plasticized PVDF with a plasticizer such as DBS (dibutyl sebacate). The addition of the plasticizer would reduce the stiffness of the PVDF, providing better restitution.

In one embodiment of the invention, a two-layer structure of a PVDF homo- or co-polymer contact layer could be surrounded by a flexible PVDF, such as KYNARFLEX from Arkema Inc. as the flexible layer. This structure would have the advantage of recyclability and re-use, as it is made entirely a polyvinylidene flouride polymer.

Other layers may be added to the multilayer structure to provide specific properties, such as barrier layers, color, clarity, price reduction and enhaced physical properties. In one example, a polyvinyl alcohol layer is added as a barrier layer.

Some possible structures useful in the present are presented below. One of skilled in the art could imagime many similar structures, based on the list and the information provided. As listed, the first listed material (a PVDF) is the layer in contact with the biopharmaceutical or chemical reagent and can be a PVDF homopolymer, copolymer terpolymer, functionalized homopolymer or functionalized copolymer.

PVDF/KYNAR ADX/tie layer/elastomer
PVDF/KYNAR ADX/LOTADER/PEBAX
PVDF/KYNAR ADX/TPU/PEBAX
KYNAR ADX/TPU/PEBAX
PVDF/KYNAR ADX/Polyamide (amine terminated preferred)/PEBAX
PVDF/KYNAR ADX/TPU/EVOH/TPU PVDF/TPU/EVOH/TPU
PVDF/KYNAR ADX/LOTADER/PEBAX/LOTADER/KYNAR ADX/PVDF
KYNAR ADX/LOTADER/PEBAX
PVDF/KYNAR ADX/LOTADER/TPO
KYNAR ADX/LOTADER/TPO
PVDF/TPU/PEBAX
KYNAR/Rubber
KYNAR ADX/Rubber
KYNAR/KYNAR ADX/Rubber
KYNAR/KYNAR ULTRAFLEX
KYNAR/KYNAR ULTRAFLEX/TPU
KYNAR/KYNAR ADX/Silicone
KYNAR 2500/KYNAR ADX blended with KYNAR 2500/LOTADER/PEBAX
KYNAR 2500/KYNAR ADX blended with KYNAR 2500/LOTADER/ENGAGE
KYNAR/KYNAR ADX/EVOH/OREVAC/Polyethylene
KYNAR/KYNAR ADX/EVOH/Nylon
KYNAR/PMMA/PVC
KYNAR/TPU/PVC
KYNAR/KYNAR ADX/TPU+PVC Structures with PVDF on both the inner and outer layer include, but are not limited to:
PVDF/KYNAR ADX/LOTADER/PEBAX/LOTADER/KYNAR ADX/PVDF
PVDF/KYNAR ADX/LOTADER/TPO/LOTADER/KYNAR ADX/PVDF
PVDF/TPU/PEBAX/TPU/PVDF
PVDF/TPU/PVDF
PVDF/RUBBER/PVDF
PVDF/KYNAR ULTRAFLEX/PVDF
PVDF/KYNAR ULTRAFLEX/TPU/PVDF
PVDF/Silicone/PVDF The multi-layer structure of the invention can be formed by processes known in the art, such as by co-extrusion, or lamination. A preferred method is by a multi-extrusion process in which two to seven layers are extruded.

A preferred use of the multi-layer structure of the invention is as flexible tubing. Multilayer tubes with a PVDF contact layer combine flexibility, durability, purity, temperature resistance, permeation resistance, tensile strength, and chemical resistance in a single structure. Such a structure has a surface having a low surface tension and therefore a low adhesion of proteins cholestrol and lipids.

The multi-layer structure could also be formed into films for use in making a variety of final articles. One of skilled in the art can imagine many uses for the flexible, durable, inert material of the invention. Some possible uses include containers, tubing and bags providing the potential to have a system utilizing only one fluid contact material. Since the flexible structures have excellent chemical resistance and inertness, a large range of chemicals can be manufactured using films made of the invention—especially for biological, biomedical, and biopharma contact applications. Other uses for the invention might include gas sampling bags—including for automotive emissions usage, chemical resistant liners for drums, covers for greenhouses, etc.

In one embodiment, the multi-layer flexible structure of the invention could be a piece of personal protection wear—in a structure essentially the reverse of a tube—having the PVDF contact layer exposed to the environment, and the flexible layer inside. His structure could find uses as a biological and chemical resistant protective suits, boots, gloves or other outerwear. With the use of PEBAX as the layer in contact with the skin, the personal protective structure would have some breathability. The use of a PEBAX/tie/PVDF-using a tie layer that adsorbs water would keep chemical or biological agents out and would feel comfortable against the body. Such a protective garment would have flexibility for movement, with the durability, toughness and resistance provided by the PVDF layer.

EXAMPLES

Multi-layer tubes were formed by coextrusion then tested by running a series of peristaltic pump tests over a certain period of time to check the amount of cycles the tube can withstand. The tube is also tested in one or more of the following ASTM tests: Tensile Properties (D412); Elongation (D412); Durometer (D2240); Modulus@100%, 200% Elongation (D412);Tear Resistance (D624); and Specific Gravity (D792).

Example 1

A 3 layer tube with PEBAX 4033/LOTADER AX8900/KYNAR 2750 was made. The layer thicknesses are 650 micron/75 micron/150-170 micron. The outer diameter of the tube was 8 mm. The tube showed good flexibility and resilience.

Example 2

A four layer tube with PEBAX 4033/LOTADER AX8900/KYNAR ADX/KYNAR 2750 was made. The layer thicknesses are 790-830 micron/150 micron/94-75 micron/330-380 micron. The outer diameter of the tube was 8 mm.

Example 3 (Comparative)

Tubes were made with KYNAR 2500, with and without 13% DBS plasticizer. The outer diameter of the tubes was ⅜" and the thickness of the tubes were 35 mils. The tube with plasticizer is substancially more flexible than tube made from Kynar 2500 without plasticizer.

Example 4 (Comparative)

A 4 layer tube with Santoprene 101-64/LOTADER AX8840/ADX 2285-03/KYNAR 2750. The layer thickness 790-830 micron/150 micron/94-75 micron/330-380 micron. The outer diameter of the tube was 8 mm.

Example 5

A 4 layer tube similar to that described in Example 4 with the exception that Engage 7086 is blended into the Lotader AX 8840 to improve the overall flexibility of the tube and adhesion.

Example 6

Two four layer tubes with the diameters of 6.2 mm and 8.2 mm and following structure were made through multilayer die and extrusion.

| Pebax 3533 SN01 | AX 8840 | KF 2500-20 g + KF 2500-20 (50% + 50%) | KF 2500-20 |
|---|---|---|---|
| Pebax 700 μm | Lotader 50 μm | graft Kynarflex + Kynarflex 80 μm | Kynarflex 80 μm |

The tubes had good adhesion between layers and had enough flexibility and resilience to be used for peristaltic tube application.

Example 7

A four layer tube with the diameter of 8.2 mm and following structure was made through multilayer head and extrusion.

| Engage 7256 | AX 8840 | ADX 1280-03 | KF 2500-20 |
|---|---|---|---|
| Polyolefin elastomer 700 μm | Lotader 50 μm | graft Kynar 80 μm | Kynarflex 80 μm |

The tube had good adhesion between layers and had enough flexibility and resilience to be used for peristaltic tube application.

Examples 8-14

The following structures of the invention can be made into tubes:

KYNAR 2800/KYNAR ADX/LOTADER/PEBAX 2533 with a thickness of 5 mil/5 mil/3 mil/35 mil KYNAR 2800/KYNAR ADX/LOTADER/TPO with thickness of 5 mil/5 mil/3 mil/35 mil KYNAR 2800/KYNAR ADX/LOTADER/TPU with thickness of 5 mil/5 mil/3 mil/35 mil

KYNAR 2800/KYNAR ULTRAFLEX

KYNAR2800/Plasticized KYNAR ULTRAFLEX or KYNAR 2500

A symmetrical structure with KYNAR 2800 on both inside and outside and KYNAR ULTRAFLEX or KYNAR 2500 on the inside.

KYNAR 2800 on the inside can be replaced with any other grade of KYNAR such as KYNAR 2500 or KYNAR 740

What is claimed is:

1. A multi-layer flexible structure in contact with bioloEical, biomedical or biopharmaceutical fluids comprising:
   a) a contact layer consisting of a poiyvinylidene fluoride polymer (PVDF) copolymer or terpolymer where vinylidene fluoride units comprise at least 70 percent by weight of said polymer and hexafluoropropene (HFP) monomer units comprise from 2 to 30 weight percent of said polymer; and
   b) one or more elastomeric layers, wherein the polyvinylidene fluoride layer is either
      1) adhered directly to the elastomeric layer, wherein the elastomeric layer is selected from the group consisting of acrylate rubber, and fluoroelastomer; or
      2) adhered indirectly to the elastomeric layer, using one or more tie layers, wherein each tie layer consists of materials selected from the group consisting of maleic anhydride grafted PVDF, functionalized polyethylene, a thermoplastic polyurethane (TPU), chlorinated polyethylene, fluoropolymer, polymethylmethacralate, and blends thereof.

2. The multi-layer structure of claim 1, wherein said PVDF in said contact layer comprises a functionalized polyvinylidene fluoride polymer.

3. The multi-layer structure of claim 1, wherein the polyvinylidene fluoride contact layer has a thickness of 3 to 500 micron.

4. The multi-layer structure of claim 1, wherein the elastonieric layer has a thickness of 250 to 1500 micron.

5. The multi-layer structure of claim 1, wherein said elastomer in structure b) 2) is selected from the group consisting of elastomeric polyamides, thermoplastic polyolefins containing grafted or reacted functional groups, polyolefin elastomers, ethylene/propylene copolymers, rubbers, styrene-ethylene-butylene-styrene polymers, thermoplastic polyurethanes, fluoroelastomers, silicones, silicone rubbers, neoprene, copolyester block thermoplastic polyethylene, nitrile rubber, butyl rubber, thermoplastic. vulcanates, polyolefins, and chlorinated vinyls.

6. The multi-layer structure of claim 5, wherein the elastomer is an elastomeric polyamide.

7. The multi-layer structure of claim 1, wherein structure 2) having at least one tie layer further comprises an ethylene vinyl alcohol layer intermediate between said PVDF layer and said elastomeric layer.

8. The multi-layer structure of claim 1, wherein said structure is a tube, a film, or a bag.

9. The multi-layer structure of claim 8, wherein said tube is directly in contact with a peristaltic pump.

10. The multi-layer structure of claim 1, wherein said structure is a piece of personal protective equipment, wherein the PVDF layer is on the outside surface, exposed to the environment, and the elastomeric layer is on the inside surface.

11. The multi-layer structure of claim 1, wherein said structure comprises a polyether-block-amide as an elastomeric layer, a PVDF contact layer, at least one tie layer between the PVDF layer and polyether-block-polyamide layer.

12. The multi-layer structure of claim 11, wherein said tie layer is either:
   a) a single layer consisting of a thermoplastic polyurethane (TPU); or
   b) a double layer consisting of, as the first layer, a TPU, or a functionalized polyethylene; and as the second layer a functionalized PVDF.

13. The multi-layer structure of claim 1 comprising a TPU as the layer and a tie-layer between the TPU and PVDF.

14. The multi-layer structure of claim 1, wherein said elastomeric layer is a flexible polyvinylidene chloride.

* * * * *

UNITED STATES PATENT AND TRADEMARK OFFICE
CERTIFICATE OF CORRECTION

| | | |
|---|---|---|
| PATENT NO. | : 9,056,447 B2 | |
| APPLICATION NO. | : 12/307626 | |
| DATED | : June 16, 2015 | |
| INVENTOR(S) | : Saeid Zerafati et al. | |

It is certified that error appears in the above-identified patent and that said Letters Patent is hereby corrected as shown below:

On the title page, item (75) Inventorship should be corrected to include Saeid Zerafati.

Signed and Sealed this
Seventeenth Day of May, 2016

Michelle K. Lee
*Director of the United States Patent and Trademark Office*